United States Patent
Dang et al.

(10) Patent No.: US 12,242,550 B1
(45) Date of Patent: Mar. 4, 2025

(54) BROWSER PLUG-IN FOR MARKETPLACE RECOMMENDATIONS

(71) Applicant: Snowflake Inc., Bozeman, MT (US)

(72) Inventors: Shuodong Dang, Sunnyvale, CA (US); Orestis Kostakis, Redmond, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/238,986

(22) Filed: Aug. 28, 2023

(51) Int. Cl.
*G06F 16/9532* (2019.01)
*G06F 9/445* (2018.01)
*G06F 16/9538* (2019.01)

(52) U.S. Cl.
CPC ...... *G06F 16/9532* (2019.01); *G06F 9/44526* (2013.01); *G06F 16/9538* (2019.01)

(58) Field of Classification Search
CPC ............. G06F 16/9532; G06F 16/9538; G06F 9/44526
See application file for complete search history.

(56) References Cited

U.S. PATENT DOCUMENTS

| | | | | |
|---|---|---|---|---|
| 8,407,576 | B1 * | 3/2013 | Yin | G06F 3/0481 715/837 |
| 10,216,554 | B2 * | 2/2019 | Sarid | G06F 9/547 |
| 11,422,862 | B1 * | 8/2022 | Faulhaber | G06F 9/45504 |
| 11,513,772 | B1 * | 11/2022 | Gross | H04L 67/10 |
| 11,973,763 | B1 * | 4/2024 | Carru | H04L 67/125 |
| 11,995,411 | B1 * | 5/2024 | Qadrud-Din | G06F 40/40 |
| 12,008,390 | B1 * | 6/2024 | Faulhaber | G06F 9/54 |
| 2008/0017722 | A1 * | 1/2008 | Snyder | G06Q 10/00 235/494 |
| 2008/0195604 | A1 * | 8/2008 | Sears | G06F 16/382 707/999.005 |
| 2008/0263009 | A1 * | 10/2008 | Buettner | G06F 16/90335 707/E17.14 |
| 2013/0103686 | A1 * | 4/2013 | Sisneros | G06Q 50/01 707/736 |
| 2014/0244713 | A1 * | 8/2014 | Grimm | G06F 16/1873 709/203 |
| 2015/0281647 | A1 * | 10/2015 | Xin | G06Q 10/10 348/14.09 |
| 2016/0063553 | A1 * | 3/2016 | Pesochinsky | H04L 67/02 705/14.55 |
| 2016/0203233 | A1 * | 7/2016 | Akselrod | G06F 16/93 715/234 |
| 2018/0052940 | A1 * | 2/2018 | Miller | G06F 3/04842 |
| 2020/0243094 | A1 * | 7/2020 | Thomson | G10L 15/28 |
| 2020/0311031 | A1 * | 10/2020 | Sim-Tang | G06F 21/6245 |
| 2021/0056147 | A1 * | 2/2021 | Pesochinsky | H04L 67/306 |
| 2021/0165801 | A1 * | 6/2021 | Sekharan | G06F 16/252 |
| 2022/0237372 | A1 * | 7/2022 | Chakrapani | G06F 40/186 |
| 2023/0060252 | A1 * | 3/2023 | Bly | G06F 18/285 |
| 2023/0066233 | A1 * | 3/2023 | van Dam | G06F 40/289 |

(Continued)

*Primary Examiner* — Mark E Hershley
(74) *Attorney, Agent, or Firm* — Womble Bond Dickinson (US) LLP

(57) ABSTRACT

A data access event may be recognized, using a browser plug-in, wherein the data access event constitutes a reference to previously obtained data. As a result of recognizing the event, the plug-in may send, to a search engine of a data exchange, a set of extracted terms. The plug-in may receive a set of related data listings related to the set of extracted terms. Upon a selection of a data listing from the set of related data listings, the plug-in may install the data listing to an account.

30 Claims, 12 Drawing Sheets

(56) References Cited

U.S. PATENT DOCUMENTS

| | | | |
|---|---|---|---|
| 2023/0222227 A1* | 7/2023 | Sankaranarayanan | G06F 9/545 |
| | | | 726/26 |
| 2023/0409615 A1* | 12/2023 | Khemka | G06V 20/68 |
| 2024/0020546 A1* | 1/2024 | Vu | G06N 5/022 |
| 2024/0160416 A1* | 5/2024 | Lyu | G06F 8/33 |

* cited by examiner

1000

1014

ECONOMY DATA ATLAS
KNOEMA

THE ECONOMY DATA ATLAS GIVES YOU A LOOK AT ECONOMIC AND FINANCIAL DEVELOPMENTS AND MACROECONOMIC INDICATORS THAT HELP SHAPE MARKET TRENDS, INCLUDING ECONOMIC OUTLOOKS, NATIONAL ACCOUNTS, LABOR MARKET, BALANCE OF PAYMENTS, FOREIGN DIRECT INVESTMENT, SHORT TERM, AND LEADING INDICATORS, PRODUCTIVITY, GOVERNMENT FINANCE, EXCHANGE RATES, AND COMMODITY PRICES.

TOPICS COVERED:
- NATIONAL ACCOUNTS
- FINANCIAL SECTOR
- ECONOMIC OUTLOOK
- LABOR MARKET
- PRICES
- SHORT-TERM AND LEADING INDICATORS
- BALANCE OF PAYMENTS

SHOW MORE ⌄

1010

1012

FREE
✓ UNLIMITED ACCESS
GET

⎕ COMMERCE

? HELP
CONTACT KNOEMA ↗
DOCUMENTATION ↗
SUPPORT ↗

↻ REFRESHES
HOURLY

BUSINESS NEEDS     VIEW ALL OBJECTS

QUANTITATIVE ANALYSIS
THE KNOEMA ECONOMY DATA ATLAS PROVIDES DATA FOR MACROECONOMIC ANALYSIS, MODELING, AND FORECASTING FOR MORE THAN 200 ECONOMIES.

DATA DICTIONARY

( DATASETS )  ( DATA_ATLAS )  ( AB=DBMFW4A )
( BNABOP2021 )  ( BEANIPA )

THIS IS A REFERENCE TABLE THAT INCLUDES THE LIST OF ALL TABLES/DATASETS INCLUDED IN THIS LISTING, WITH KEY DETAILS ON EACH TABLE/DATASET INCLUDING NAME, SOURCE, FREQUENCY OF REFRESH, SOURCE, DOCUMENTATION ON DATA, ETC.

📅 TIME COVERAGE
NEXT 6 MONTHS
BY WEEK

◉ GEOGRAPHIC COVERAGE
GLOBAL
BY COUNTY

☺ ABOUT KNOEMA
KNOEMA IS THE MOST COMPREHENSIVE SOURCE OF GLOBAL DECISION-MAKING DATA IN THE WORLD. OUR DATA...

SHOW MORE ⌄

| NAME | TYPE | DESCRIPTION |
|---|---|---|
| DATASETID | AA VARCAR | — |
| DATASETNAME | AA VARCAR | — |
| FREQUENCIES | ⏱ DATE | — |
| FIRSTDATE | ⏱ DATE | — |
| LASTDATE | ⏱ DATE | — |
| PUBLICATIONDATE | ⏱ DATE | — |
| LASTUPDATEDATE | ⏱ DATE | — |
| NEXT RELEASE DATE | ⏱ DATE | — |
| URL | AA VARCAR | — |
| SOURCE | AA VARCAR | — |

1016

SHOW ALL COLUMNS ⌄

```
┌─────────────────────────────────────────────────────┐
│ RECOGNIZE A DATA ACCESS EVENT, WITH A BROWSER PLUG-IN, │
│    WHEREIN THE EVENT CONSTITUTES A REFERENCE TO     │
│              PREVIOUSLY OBTAINED DATA;              │
│                        1110                         │
└─────────────────────────────────────────────────────┘
                          │
                          ▼
┌─────────────────────────────────────────────────────┐
│ AS A RESULT OF RECOGNIZING THE DATA ACCESS EVENT, SEND, │
│  BY THE BROWSER PLUG-IN TO A SEARCH ENGINE OF A DATA │
│        EXCHANGE, A SET OF EXTRACTED TERMS;          │
│                        1120                         │
└─────────────────────────────────────────────────────┘
                          │
                          ▼
┌─────────────────────────────────────────────────────┐
│  RECEIVE, FROM THE DATA EXCHANGE, A SET OF DATA LISTINGS │
│         RELATED TO THE EXTRACTED TERMS;             │
│                        1130                         │
└─────────────────────────────────────────────────────┘
                          │
                          ▼
┌─────────────────────────────────────────────────────┐
│  UPON A SELECTION OF A DATA LISTING FROM THE SET OF │
│  RELATED DATA LISTINGS, INSTALL THE DATA LISTING TO AN │
│                       ACCOUNT                       │
│                        1140                         │
└─────────────────────────────────────────────────────┘
```

FIG. 11

BROWSER PLUG-IN FOR MARKETPLACE RECOMMENDATIONS

TECHNICAL FIELD

The present disclosure relates to data sharing platforms, and particularly to providing, automatically or on-demand, a user with suggestions for relevant listings within a data sharing platform.

BACKGROUND

Databases are widely used for data storage and access in computing applications. Databases may include one or more tables that include or reference data that can be read, modified, or deleted using queries. Databases may be used for storing and accessing personal information or other sensitive information. Secure storage and access of database data may be provided by encrypting and storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 10 is a block diagram of a user interface presenting a description of an example listing incorporating a data dictionary, in accordance with some embodiments of the present disclosure.

FIG. 11 is a flow diagram of a method for providing a user with suggestions for relevant listings in a data exchange, in accordance with some embodiments of the present disclosure.

DETAILED DESCRIPTION

Figure 1:
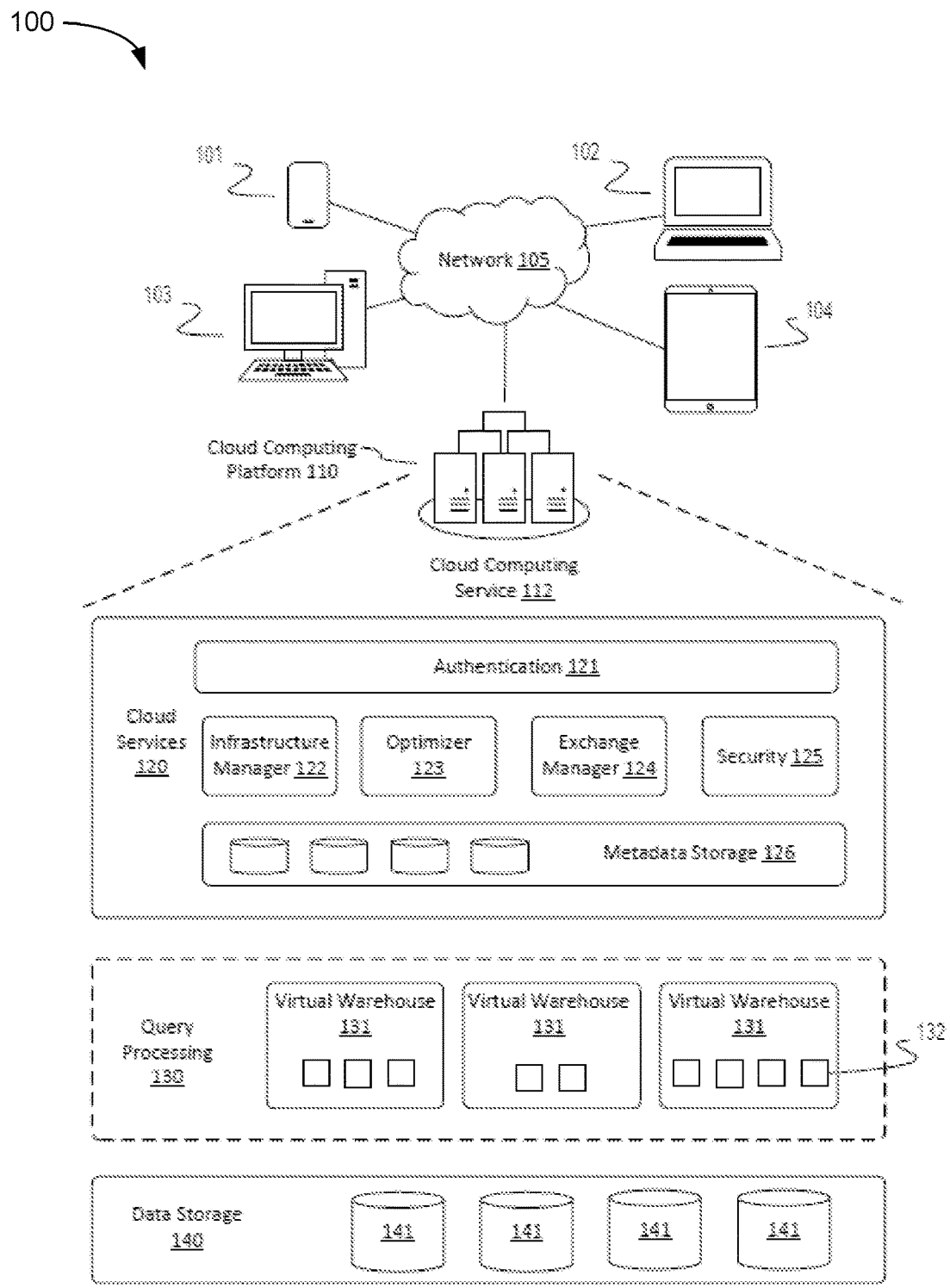
FIG. 1 is a block diagram of an example computing environment in which the systems and methods disclosed herein may be implemented, in accordance with some embodiments of the present disclosure.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use slow, burdensome methods to transfer the data, such as file-transfer-protocol (FTP) or copying the data onto physical media and mailing the physical media to the other entity. These methods can have several disadvantages. First, they can be slow as copying terabytes or petabytes of data can take days. Second, once delivered, the provider cannot control what happens to the data. The recipient can alter the data, make copies, or share it with other parties. Third, the only entities that would likely be interested in manipulating such large data sets in such a manner are large corporations that can afford the complex logistics of transferring and processing the data as well as the high price of such a cumbersome data transfer. Thus, smaller entities, e.g., "mom and pop" shops, or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it can be difficult to share data assets with many entities because, for the reasons mentioned above, traditional data sharing methods do not allow scalable sharing. Traditional sharing methods can also result in latency and delays in terms of all parties having access to the most recently updated data.

Private and public data exchanges may allow data providers to share their data assets more easily and securely with other entities. A public data exchange, also referred to herein as a "Snowflake data marketplace," or a "data marketplace," may provide a centralized repository with open access, in which a data provider may publish and control live and read-only data sets to thousands of consumers. A private data exchange, also referred to herein as a "data exchange," may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allow data providers to offer data assets directly from their own online domain, e.g., website, in a private online marketplace with their own branding. The data exchange may provide a centralized, managed hub for an entity to list internally- or externally-shared data assets, inspire data collaboration, maintain data governance, and audit access. With the data exchange, data providers may be able to share data without copying it between companies. Data providers may invite other entities to view their data listings, control which data listings appear in their private online marketplace, and control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, in which a data consumer, e.g., the new clothing brand, may browse, explore, discover, access and potentially purchase data sets directly from Company A. Further, Company A may control who can enter the data exchange, the entities that may view a particular listing, the actions that an entity may take with respect to a listing, e.g., view only, and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may marshal data from across its divisions and departments, which could become valuable to another company. In addition, participants in a private ecosystem data exchange may work together to join their datasets to create a useful data product that either one of them alone would be unable to produce. Once these joined datasets are created, they may be listed on the data exchange or on the data marketplace.

Sharing data may be performed when a data provider creates a share object (hereinafter referred to as a share) of a database in the data provider's account and grants the share access to particular objects, e.g., tables, secure views, and secure user-defined functions (UDFs), of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share; (2) the privileges that grant access to the specific objects, e.g., tables, secure views, and secure UDFs; and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, or import from this share object. By modifying the list of references of other consumer accounts, the share object can be made accessible to more accounts or be restricted to fewer accounts.

Data exchanges typically contain a large number of available data listings. To assist users in navigating the data exchange, and to allow them to find listings that are relevant to them, the data exchange often provides a data listing search and rank capability. The search and rank capability may include a retrieval phase, and a ranking phase. During the retrieval phase, the data exchange may retrieve listings relevant to the user's search/query and ensure that only relevant listings are presented. During the ranking phase, the data exchange may determine the order (priority) in which the retrieved listings are presented to the user, e.g., via a UI or a programmatic interface. Retrieved listings are often ordered based on either popularity, the date of the listing's addition, i.e., "most recent," alphabetically based on the data listing titles, or a weighted version of the term frequency-inverse document frequency (TF-IDF), with each of these as a distinct option. The TF-IDF is a numerical statistic that is intended to reflect how important a word is to a document in a collection or corpus, and a TF-IDF analysis may result in a score for individual words in a data listing based on the importance of that word.

Many data exchanges provide access to their listings through a graphical user interface, often a browser-based interface. Through this interface, users can search and browse through the exchange's catalog. However, users are often required to purposefully visit a marketplace in order to search for relevant listings. This can cause a problem by interrupting users' workflows-requiring them to set their work aside to access a data exchange. Embodiments of the present disclosure address the above noted and other problems by providing techniques for the use of a browser plug-in, that can on-demand or automatically provide a user with suggestions for relevant listings in a data exchange.

A browser plug-in, or extension, is a small software module that users can install in their web browsers to extend the functionality of their browser, empowering users to customize their browsing experience and add new features that enhance productivity. Plug-ins can integrate seamlessly with the browser's core features to provide additional functionality not present in the original browser.

Plug-ins can employ a modular architecture that allows them to coexist with the core browser functionalities. When a user installs a plug-in, it becomes part of the browser's runtime environment and can then access web pages, modify content, and interact with the user interface. Plug-ins can use browser-specific application programming interfaces (APIs) to access browser features and web content. Browser plug-ins can include user interface (UI) elements to interact with users. This can include adding buttons to the browser's toolbar, context menus, or pop-up windows. The UI elements allow users to control the plug-in's behavior, access its features, and customize settings.

In some embodiments, the web browser can incorporate a notebook application that produces notebook documents. Notebook documents contain both computer code, e.g. python, and rich text elements, e.g., paragraphs, equations, figures, links. Notebook documents are both human-readable documents containing the analysis description and the results (figures, tables, etc . . . ) as well as executable documents that can perform data analysis. In some embodiments, a browser plug-in can access data persisted in a notebook document.

Consequently, the use of a browser plug-in can provide on-demand or automatic workflow assistance for a user with suggestions for additional listings from a database system, that are relevant to the user's current tasks and do not require them to interrupt their work in order to visit a marketplace or data exchange.

FIG. 1 is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110, e.g., data management and access, and analysis functions, e.g., SQL queries, as well as other computation capabilities, e.g., secure data sharing between users of the cloud computing platform 110. The cloud computing platform 110 may include a three-tier architecture including data storage 140, query processing 130, and cloud services 120.

Data storage 140 may facilitate storing data on the cloud computing platform 110 in one or more cloud databases 141. Data storage 140 may use a storage service such as Amazon S3™ to store data and query results on the cloud computing platform 110. In particular embodiments, in order to load data into the cloud computing platform 110, data tables may be horizontally partitioned into large, immutable files that may be analogous to blocks or pages in a traditional database system. Within each file, the values of each attribute or column can be grouped together and compressed using a scheme sometimes referred to as hybrid columnar. Each table can have a header which, among other metadata, contains the offsets of each column within the file.

In addition to storing table data, data storage 140 facilitates the storage of temporary data generated by query operations, e.g., joins, as well as the data contained in large query results. This may allow the system to compute large queries without out-of-memory or out-of-disk errors. Storing query results this way may simplify query processing by removing the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that can be created, destroyed, or resized at any point, on demand. This functionality may create an "elastic" virtual warehouse that expands, contracts, or shuts down according to the user's needs. Expanding a virtual warehouse involves generating or adding one or more compute nodes 132 to a virtual warehouse 131. Contracting a virtual warehouse involves removing one or more compute nodes 132 from a virtual warehouse 131. More compute nodes 132 may lead to faster compute times. For example, a data load that takes fifteen hours on a system with four nodes might take only two hours with thirty-two nodes.

Cloud services 120 may be a collection of services that coordinate activities across the cloud computing service 112. These services can tie together the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, an authentication engine 121, an infrastructure manager 122, an optimizer 123, an exchange manager 124, a security engine 125, and a metadata storage 126.

Figure 2:
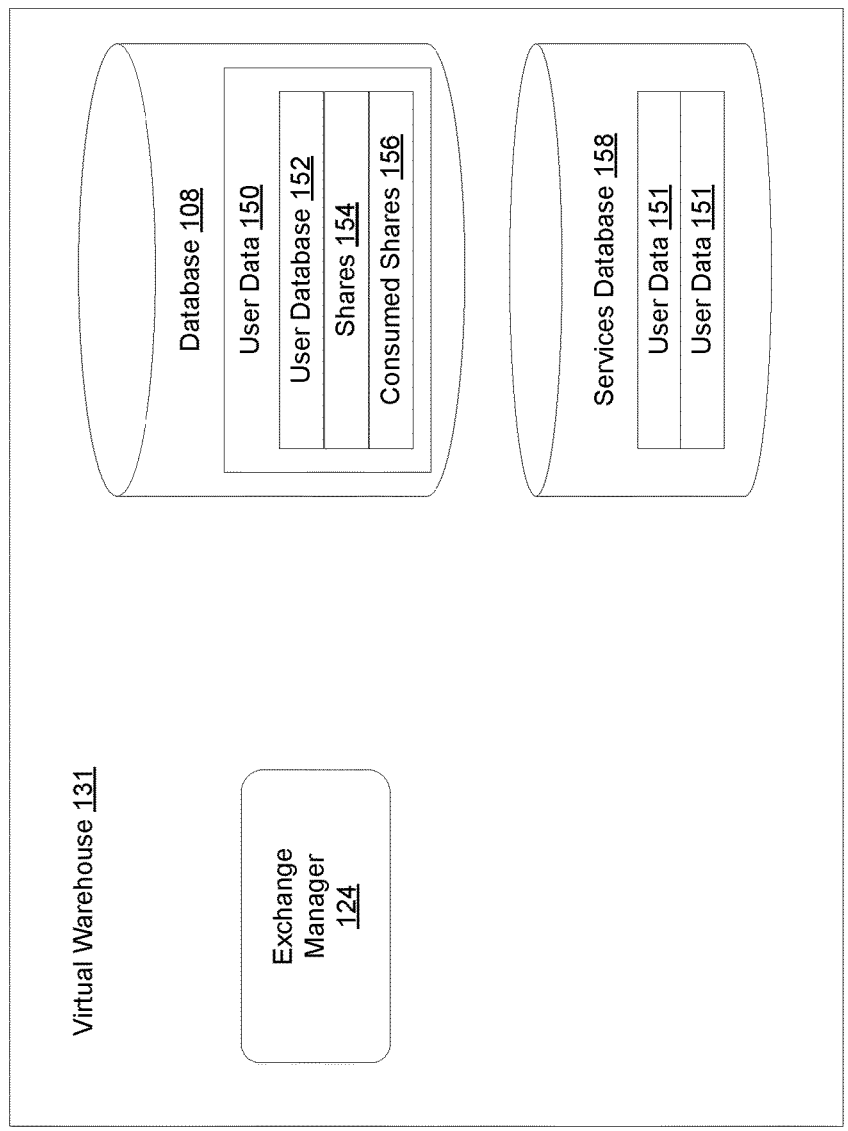
FIG. 2 is a block diagram illustrating an example virtual warehouse, in accordance with some embodiments of the present disclosure.

FIG. 2 is a block diagram illustrating an example virtual warehouse 131, as also shown in FIG. 1. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g., different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share; (2) the privileges that grant access to the specific objects, e.g., tables, secure views, and secure UDFs; and (3) the consumer accounts with which the database and its objects are shared. When data is shared, no data is copied or transferred between users. Sharing can be accomplished through the cloud services 120 of cloud computing service 112.

Sharing data may be performed by a data provider creating a share of a database in the data provider's account and granting access to particular objects, e.g., tables, secure views, and secure user-defined functions (UDFs). A read-only database may then be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that while analysis is performed with respect to shared data, the actual shared data is not accessible by the data consumer, e.g., recipient of the share. A secure join may be performed as described in U.S. application Ser. No. 16/368,339, filed Mar. 28, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations, e.g., joining, aggregating, or analysis, ascribed to a user (consumer or provider) shall be understood to include performing of such actions by the cloud computing service 112 in response to an instruction from that user.

Figure 3:
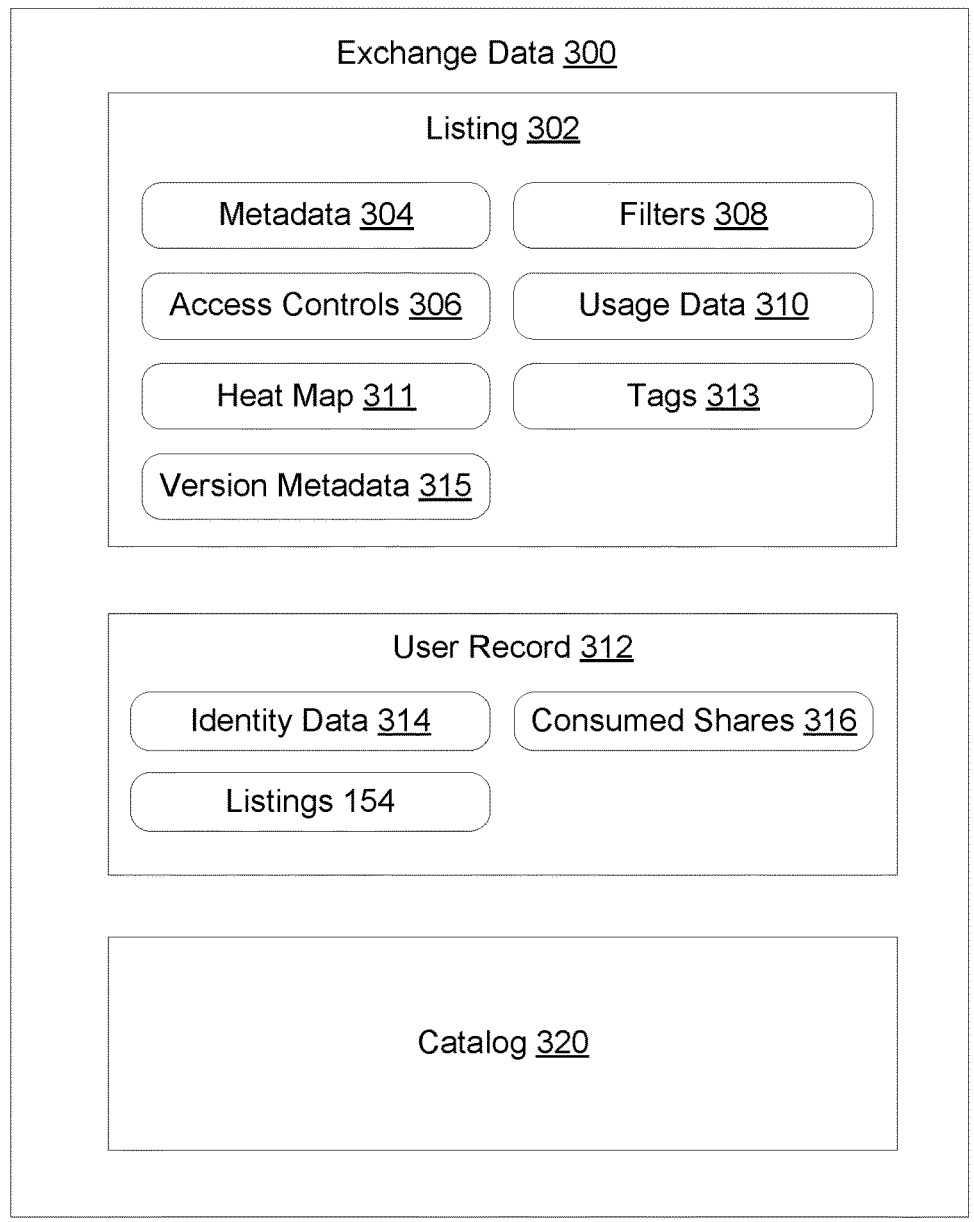
FIG. 3 is a block diagram of data that may be used to implement a public or private data exchange, in accordance with some embodiments of the present disclosure.

FIG. 3 is a block diagram of data that may be used to implement a public or private data exchange in accordance with an embodiment of the present disclosure. The exchange manager 124 may operate with respect to some or all of the illustrated data exchange 300, which may be stored on the platform executing the exchange manager 124, e.g., the cloud computing platform 110, or at some other location. The data exchange 300 may include a plurality of listings 302 describing data that is shared by a first user ("the provider"). The listings 302 may be listings in a data exchange or in a data marketplace. The access controls, management, and governance of the listings may be similar for both a data marketplace and a data exchange.

The listing 302 may include access controls 306, which may be configurable to any suitable access configuration. For example, access controls 306 may indicate that the shared data is available to any member of the data exchange without restriction (an "any share" as used elsewhere herein). The access controls 306 may specify a class of users (members of a particular group or organization) that are allowed to access the data and/or see the listing. The access controls 306 may specify a "point-to-point" share in which users may request access but are only allowed access upon approval of the provider. The access controls 306 may further specify a set of users that are excluded from accessing the data referenced by the listing 302.

Note that some listings 302 may be discoverable by users without further authentication or access permissions whereas actual accesses are only permitted after a subsequent authentication step. The access controls 306 may specify that a listing 302 is only discoverable by specific users or classes of users.

Note also that a default function for listings 302 is that the data referenced by the share is not exportable by the consumer. Alternatively, the access controls 306 may specify that this is not permitted. For example, access controls 306 may specify that secure operations (secure joins and secure functions as discussed below) may be performed with respect to the shared data such that viewing and exporting of the shared data is not permitted.

In some embodiments, once a user is authenticated with respect to a listing 302, a reference to that user, e.g., the user identifier of the user's account with the virtual warehouse 131, is added to the access controls 306 such that the user will subsequently be able to access the data referenced by the listing 302 without further authentication.

The listing 302 may define one or more filters 308. For example, the filters 308 may define specific identity data 314 (also referred to herein as user identifiers) of users that may view references to the listing 302 when browsing the catalog 320. The filters 308 may define a class of users, e.g., users of a certain profession, users associated with a particular company or organization, users within a particular geographical area or country, that may view references to the listing 302 when browsing the catalog 320. In this manner, a private data exchange may be implemented by the exchange manager 124 using the same components. In some embodiments, an excluded user that is excluded from accessing a listing 302, i.e., adding the listing 302 to the consumed shares 156 of the excluded user, may still be permitted to view a representation of the listing when browsing the catalog 320 and may be further permitted to request access to the listing 302 as discussed below. Requests to access a listing by such excluded users and other users may be listed in an interface presented to the provider of the listing 302. The provider of the listing 302 may then view demand for access to the listing and choose to expand the filters 308 to permit access to excluded users or classes of excluded users, e.g., users in excluded geographic regions or countries.

Filters 308 may further define what data may be viewed by a user. In particular, filters 308 may indicate that a user that selects a listing 302 to add to the consumed shares 156 of the user is permitted to access the data referenced by the listing but only a filtered version that only includes data associated with the identifier 314 of that user, associated with that user's organization, or specific to some other classification of the user. In some embodiments, a private data exchange is by invitation: users invited by a provider to view listings 302 of a private data exchange are enabled to do by the exchange manager 124 upon communicating acceptance of an invitation received from the provider.

In some embodiments, a listing 302 may be assigned to a single user. Accordingly, a reference to the listing 302 may be added to a set of "pending shares" that is viewable by the user. The listing 302 may then be added to a group of shares of the user upon the user communicating approval to the exchange manager 124.

The listing 302 may further include usage data 310. For example, the cloud computing service 112 may implement a credit system in which credits are purchased by a user and are consumed each time a user runs a query, stores data, or uses other services implemented by the cloud computing service 112. Accordingly, usage data 310 may record an amount of credits consumed by accessing the shared data. Usage data 310 may include other data such as a number of queries, a number of aggregations of each type of a plurality of types performed against the shared data, or other usage statistics. In some embodiments, usage data for one or more listings 302 of a user is provided to the user in the form of a shared database, i.e., a reference to a database including the usage data is added by the exchange manager 124 to the consumed shares 156 of the user.

The listing 302 may also include a heat map 311, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 311 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 302 may also include one or more tags 313. The tags 313 may facilitate simpler sharing of data contained in one or more listings. As an example, a large company may have a human resources (HR) listing containing HR data for its internal employees on a data exchange. The HR data may contain ten types of HR data, e.g., employee number, selected health insurance, current retirement plan, or job title. The HR listing may be accessible to 100 people in the company, e.g., everyone in the HR department. Management of the HR department may wish to add an eleventh type of HR data, e.g., an employee stock option plan. Instead of manually adding this to the HR listing and granting each of the 100 people access to this new data, management may simply apply an HR tag to the new data set that can be used to categorize the data as HR data, list it along with the HR listing, and grant access to the 100 people to view the new data set.

The listing 302 may also include version metadata 315. Version metadata 315 may provide a way to track how the datasets are changed. This may assist in ensuring that the data that is being viewed by one entity is not changed prematurely. For example, if a company has an original data set and subsequently releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 315. The cloud computing service 112 may ensure that each data consumer accesses the same version of the data until they accept an updated version that will not interfere with current processing of the data set.

The data exchange 300 may further include user records 312. A user record 312 may include data identifying the user associated with the user record 312, e.g., an identifier, such as a warehouse identifier, of a user having user data 151 in services database 158 and managed by the virtual warehouse 131.

The user record 312 may list shares associated with the user, e.g., reference listings 154, created by the user. The user record 312 may list shares consumed by the user, e.g., reference listings 302, created by another user that have been associated with the account of the user according to the methods described herein. For example, a listing 302 may have an identifier that will be used to reference it in the shares or consumed shares 156 of a user record 312.

The listing 302 may also include metadata 304 describing the shared data. The metadata 304 may include some or all of the following information: an identifier of the provider of the shared data; a URL associated with the provider; a name of the share; a name of tables; a category to which the shared data belongs; an update frequency of the shared data; a catalog of the tables; and a number of columns and a number of rows in each table, as well as names for the columns. The metadata 304 may also include examples to aid a user in using the data. Such examples may include sample tables that include a sample of rows and columns of an example table, example queries that may be run against the tables, example views of an example table, example visualizations, e.g., graphs or dashboards, based on a table's data. Other information included in the metadata 304 may be metadata for use by business intelligence tools, such as text descriptions of data contained in the table, keywords associated with the table to facilitate searching, a link, e.g., a URL, to documentation related to the shared data, and a refresh interval indicating how frequently the shared data is updated along with the date the data was last updated.

The metadata 304 may further include category information indicating a type of the data/service, e.g., location or weather, industry information indicating who uses the data/service, e.g., retail or life sciences, and use case information that indicates how the data/service is used, e.g., supply chain optimization or risk analysis. For instance, retail consumers may use weather data for supply chain optimization. A use case may refer to a problem that a consumer is solving i.e., an objective of the consumer, such as supply chain optimization. A use case may be specific to a particular industry, or can apply to multiple industries. Any given data listing, i.e., a dataset, can help solve one or more use cases, and hence may be applicable to multiple use cases.

The data exchange 300 may further include a catalog 320. The catalog 320 may include a listing of all available listings 302 and may include an index of data from the metadata 304 to facilitate browsing and searching according to the methods described herein. In some embodiments, listings 302 are stored in the catalog in the form of JavaScript Object Notation (JSON) objects.

Note that where there are multiple instances of the virtual warehouse 131 on different cloud computing platforms, the catalog 320 of one instance of the virtual warehouse 131 may store listings or references to listings from other instances on other cloud computing platforms 110. Accordingly, each listing 302 may be globally unique, e.g., be assigned a globally unique identifier across all of the instances of the virtual warehouse 131. For example, the instances of the virtual warehouses 131 may synchronize their copies of the catalog 320 such that each copy indicates the listings 302 available from all instances of the virtual warehouse 131. In some instances, a provider of a listing 302 may specify that it is to be available only on specified computing platforms 110.

In some embodiments, the catalog 320 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 320 from any web browser. The exchange manager 124 may expose uniform resource locators (URLs) linked to each listing 302. This URL may be searchable and can be shared outside of any interface implemented by the exchange manager 124. For example, the provider of a listing 302 may publish the URLs for its listings 302 in order to promote usage of its listing 302 and its brand.

Figure 4:
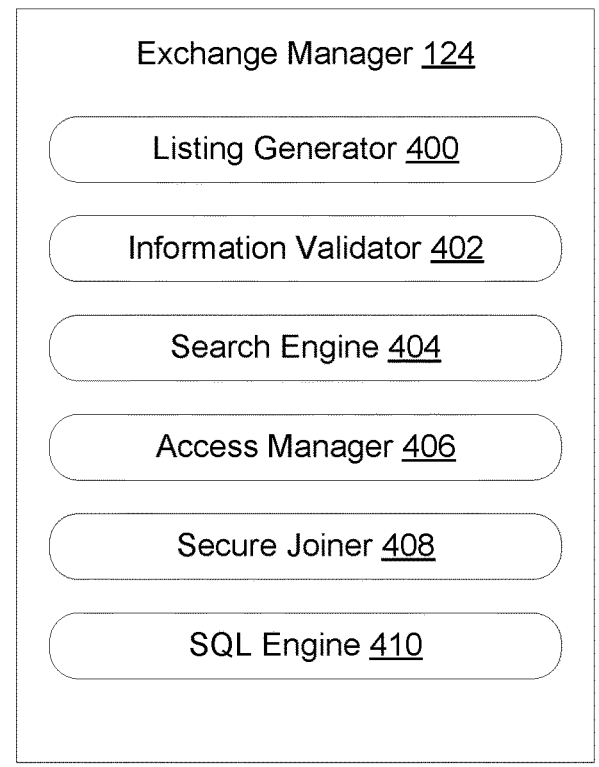
FIG. 4 is a block diagram of various components that may be included in an exchange manager, in accordance with some embodiments of the present disclosure.

FIG. 4 is a block diagram of various components 400-410 that may be included in an exchange manager 124. One or more of the components 400-410 may be implemented as a software module (executed by a processing device), firmware that is included on a processing device, or in any other appropriate manner. A listing generator 400 may provide an interface for creating listings 302 as illustrated on FIG. 3. For example, a webpage interface to the virtual warehouse 131 that enables a user on a device 101-104 to select data, e.g., a specific table in user data 150 of the user, for sharing and enter values defining metadata 304, access controls 306, and filters 308. In some embodiments, creation may be performed by a user by way of SQL commands in an SQL interpreter executing on the cloud computing platform 110 and accessed by way of a webpage interface on a user device 101-104.

An information validator 402 may validate information provided by a provider attempting to create a listing 302. Note that in some embodiments the actions ascribed to the information validator 402 may be performed by a human reviewing the information provided by the provider. In other embodiments, these actions are performed automatically. The information validator 402 may perform, or facilitate performing by a human operator, various functions. These functions may include verifying that the metadata 304 is consistent with the shared data to which it references, verifying that the shared data referenced by metadata 304 is not pirated data, or excludes personal identification information (PII), personal health information (PHI), or other data for which sharing is undesirable or illegal. The information validator 402 may also facilitate the verification that the data has been updated within a threshold period of time, e.g., within the last twenty-four hours. The information validator 402 may also facilitate verification that the data is not static or unavailable from other static public sources. The information validator 402 may also facilitate verification that the data is more than merely a sample, e.g., that the data is sufficiently complete to be useful. For example, geographically limited data may be undesirable whereas an aggregation of data that is not otherwise limited may be useful.

The exchange manager 124 may include a search engine 404. The search engine 404 may implement a webpage interface that is accessible by a user-on-user devices 101-104 in order to invoke searches for search strings with respect to the metadata in the catalog 320, receive responses to searches, and select references to listings 302 in search results for adding to the consumed shares 156 of the user record 312 of the user performing the search. In some embodiments, searches may be performed by a user through SQL commands in an SQL interpreter executing on the cloud computing platform 110 and accessed by way of a webpage interface on user devices 101-104. For example, searching for shares may be performed with SQL queries against the catalog 320 within the SQL engine 410, as discussed below.

The search engine 404 may also implement a recommendation algorithm. For example, the recommendation algorithm may recommend other listings 302 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing for data in one domain (geographic area, technical field, etc.) results in a recommendation of a listing for a different domain to facilitate more complete coverage for the user's analysis (different geographic area, related technical field, etc.).

The exchange manager 124 may include an access manager 406. As described above, a user may add a listing 302. This may require authentication by the provider of the listing 302. Once a listing 302 is added to the consumed shares 156 of the user record 312 of a user, the user may be either (a) required to authenticate each time the data referenced by the listing 302 is accessed or (b) be automatically authenticated and allowed to access the data upon addition of the listing 302. The access manager 406 may manage automatic authentication for subsequent access of data in the consumed shares 156 of a user in order to provide seamless access of the shared data as if it was part of the user data 150 of that user. To that end, the access manager 406 may utilize the access controls 306 of the listing 302, certificates, tokens, or other authentication material in order to authenticate the user when performing accesses to shared data.

The exchange manager 124 may include a secure joiner 408. The secure joiner 408 can manage the integration of shared data referenced by consumed shares 156 of one user with those of another, i.e., shared data from different providers, and with a user database 152 of data owned by the user. In particular, the secure joiner 408 may manage the execution of queries and other computation functions with respect to various sources of data such that their access is transparent to the user. The secure joiner 408 may further manage the access of data to enforce restrictions on shared data, such that analysis may be performed, and the results of the analysis displayed without exposing the underlying data to the consumer of the data where this restriction is indicated by the access controls 306 of a listing 302.

The exchange manager 124 may further include a standard query language (SQL) engine 410 that is programmed to receive queries from a user and execute the query with respect to data referenced by the query, which may include consumed shares 156 of the user and the user data 150 owned by the user. The SQL engine 410 may perform any query processing functionality known in the art. The SQL engine 410 may additionally or alternatively include any other database management tool or data analysis tool known in the art. The SQL engine 410 may define a webpage interface executing on the cloud computing platform 110 through which SQL queries are input and responses to SQL queries are presented.

Figure 5:
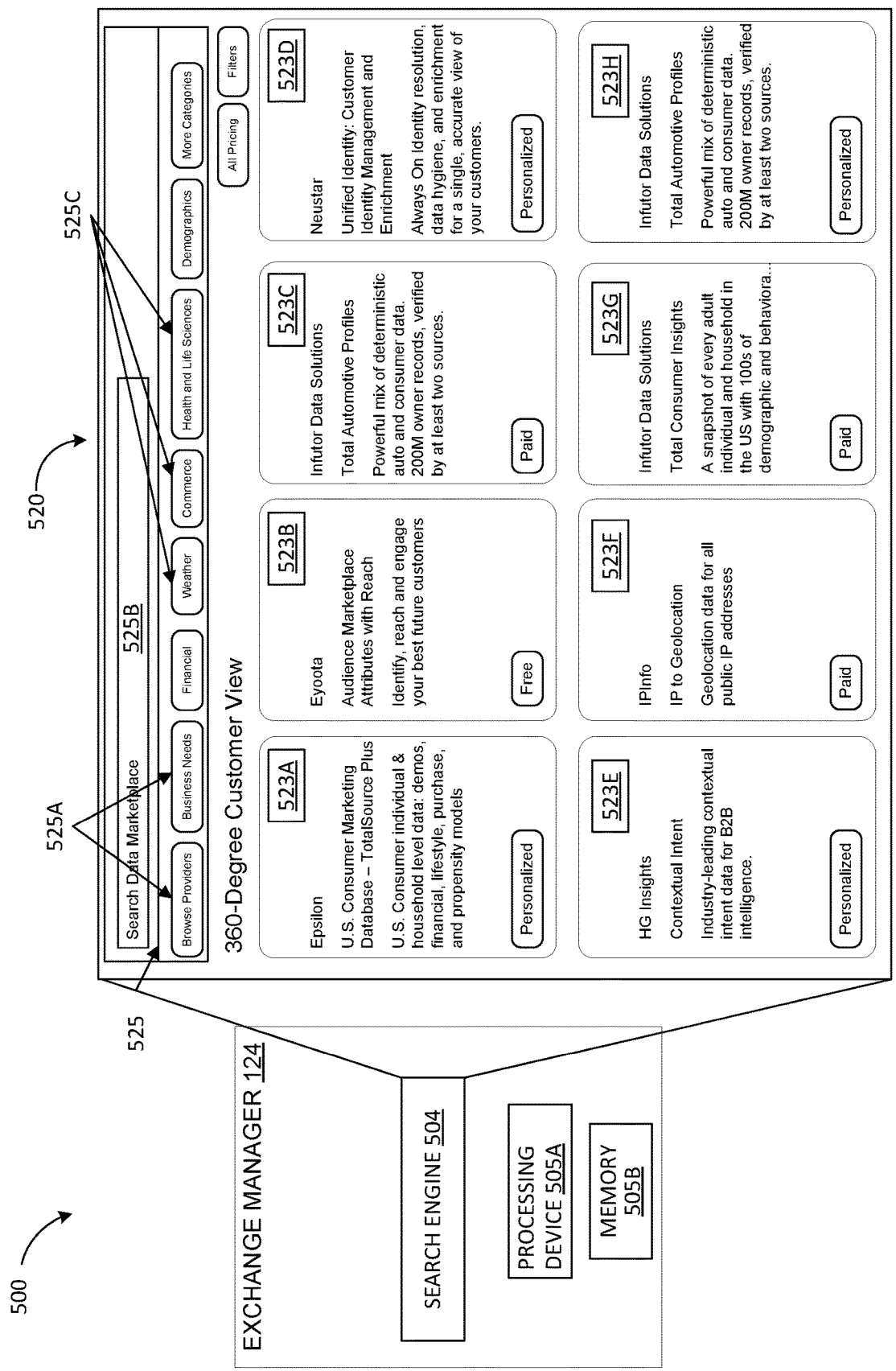
FIG. 5 is a schematic block diagram of deployment of a data exchange in which users can be, automatically or on-demand, provided with suggestions for relevant listings, in accordance with some embodiments of the present disclosure.

FIG. 5 is a block diagram of a data exchange in which users can be, automatically or on-demand, provided with suggestions for relevant listings, in accordance with some embodiments of the present disclosure. FIG. 5 illustrates a cloud environment 500 comprising an exchange manager 124, which may comprise a similar architecture to that of exchange manager 124 (as illustrated in FIG. 1), executing within cloud computing service 112 (as also illustrated in FIG. 1) and may be a deployment of a data exchange or data marketplace.

The exchange manager 124 may be a computing device, and may include hardware such as processing device 505A, e.g., processors, central processing units (CPUs), memory 505B, e.g., random access memory, (RAM), storage devices, e.g., hard-disk drives (HDDs), solid-state drives (SSDs), and other hardware devices, e.g., sound cards or video cards.

Processing device 505A may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 505A may also include one or more special-purpose processing devices such as a microcontroller, an application specific integrated circuit (ASIC), a field programmable gate array (FPGA), a digital signal processor (DSP), network processor, or the like.

Memory 505B may include volatile memory devices, e.g., RAM, non-volatile memory devices, e.g., flash memory, and/or other types of memory devices. As a non-limiting example, the non-volatile memory may include a read-only memory (ROM), a programmable read-only memory (PROM), an erasable programmable read-only memory (EPROM), an electrically erasable programmable read-only memory (EEPROM), or a flash memory. In certain implementations, memory 505B may be non-uniform access (NUMA), such that memory access time depends on the memory location relative to processing device 505A. In some embodiments, memory 505B may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 505B may be configured for long-term storage of data and may retain data between power on/off cycles.

Although illustrated as a single cloud deployment, the cloud environment 500 may have multiple cloud deployments that may be physically located in separate remote geographical regions, but may collectively constitute a single data exchange or data marketplace. Although embodiments of the present disclosure are described with respect to a data exchange, this is for purposes of an example only and the embodiments of the present disclosure may be implemented in any appropriate enterprise database system or data sharing platform in which data may be shared among users of the system or platform.

As discussed herein, data that is to be shared via a share object may be represented within the data exchange by a listing 302 as discussed herein with respect to FIG. 3. The exchange manager 124 may include a search engine 504 that may provide logic and an interface for searching for data listings. In some embodiments, the search engine 504 may be similar to the search engine 404 described herein with respect to FIG. 4. FIG. 5 further illustrates a data listing interface 520 with which the user may navigate the data exchange and search for or add listings. The interface 520 may be provided by the data exchange when the user logs into the data exchange via, for example, a web browser. As discussed herein, the data exchange may include a plurality of published data listings 523A-523H, and the data listing interface 520 may include interactable representations of each of these published data listings 523A-523H (hereinafter referred to as data listings 523) as well as a listing search and filter feature 525. The listing search and filter feature 525 may include a number of different tools for searching for/filtering through the published data listings 523A-523H including provider drop-down menus 525A (to search for or filter data listings 523 by provider), a keyword search bar 525B (to search for or filter data listings 523 by keyword) and category filters 525C (to search for or filter data listings 523 by category).

As discussed hereinabove, during a retrieval phase the data exchange may retrieve listings relevant to the user's search/query and ensure that only relevant listings are presented. During a ranking phase, the data exchange may determine an order (priority) in which the retrieved listings are presented to the user, e.g., via a UI or a programmatic interface. Search results can be ranked based on popularity, the date of the listing's addition (i.e., "most recent"), alphabetically based on the data listing titles, or a weighted version of the TF-IDF.

Figure 6:
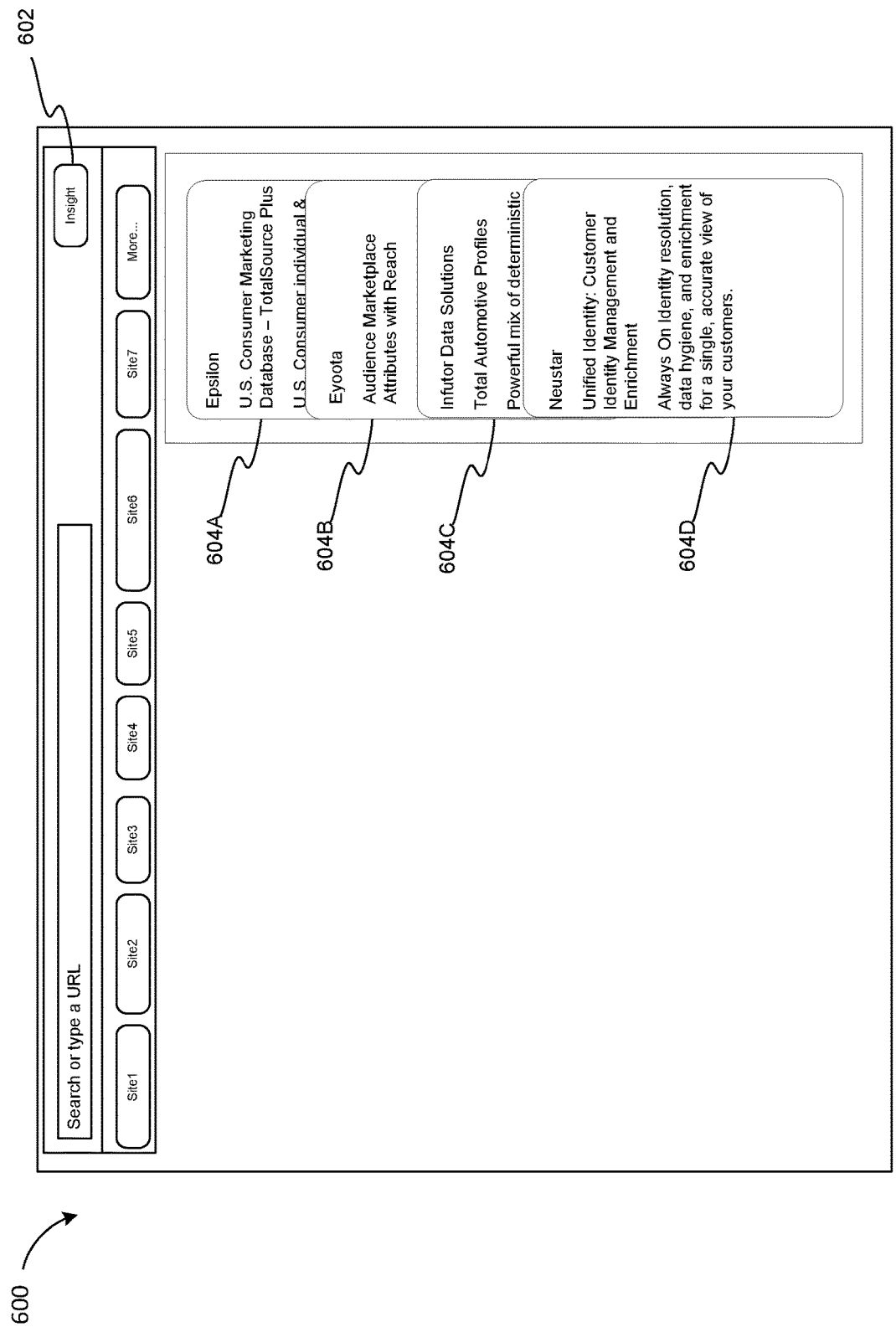
FIG. 6 illustrates an interface, in which a user can be, automatically or on-demand, provided with suggestions for relevant listings in a data exchange, according to some embodiments of the present disclosure.

FIG. 6 illustrates an interface 600, in which a user can be provided with suggestions for relevant listings in a data exchange, according to some embodiments of the present disclosure. The interface 600 may be provided by the data exchange when the user logs into the data exchange via, for example, a web browser. The interface 600 may also include an icon to activate the browser plug-in. As discussed herein, as a result of a trigger, the plug-in may obtain from the data exchange and present a plurality of published data listings 604A-D, which have been determined to be relevant to the current activity of the user working in the interface 600 The interface may also include standard browser features such as a toolbar and bookmarks.

Browser activity can cause, or trigger, the plug-in to search a data exchange and provide data listing recommendations to the user. In some embodiments, these recommendations are provided through a mini-browsing view originating from the plug-in. In some embodiments a selection of listings 604A-D may be provided, ranked by relevance, and a user can skim through the listings. In another embodiment, the most relevant single result can be shown. Upon finding a suitable listing, in some embodiments, the listing can be installed to the user's data exchange account without having to navigate to the data exchange. At a later time, upon accessing their data exchange account, the new listing is available to and consumable by the user.

Automatic triggering can result from the plug-in monitoring the user's activity and detecting the use of a notebook environment or a notebook document. In some embodiments, the plug-in extracts terms from the interaction with the notebook document and sends those extracted terms to a database system or a data exchange. In some embodiments, parsing of the queries to extract the terms occurs at the client in order to maintain privacy. In some embodiments, the database system or data exchange responds with listings that are related to those listings relevant to the implicit search terms, i.e., the extracted terms.

In some embodiments, an affinity between listings can be based on user-behavior, e.g., whether users have co-viewed, co-installed, or co-used those listings. In some embodiments, affinity between listings may be listing/data-specific, for example, whether they share common column names or semantic types, such as address or ZIP code. In some embodiments, affinity between listings may result from sharing data values, such as names, addresses, etc.

In some embodiments, hybrid triggering involves the plug-in remaining on stand-by, but only executing detection logic, i.e., parsing the browser contents and extracting the needed search terms, upon the user's instruction. In some embodiments, this can be accomplished by clicking on the plug-in's icon 602 in the browser.

As discussed hereinabove, during a retrieval phase the browser plug-in may retrieve listings relevant to the user's search/query and ensure that only relevant listings are presented. During a ranking phase, the data exchange may determine an order (priority) in which the retrieved listings are presented to the user, e.g., via a UI or a programmatic interface. Search results can be ranked based on popularity, the date of the listing's addition (i.e., "most recent"), alphabetically based on the data listing titles, or a weighted version of the TF-IDF.

Figure 7:
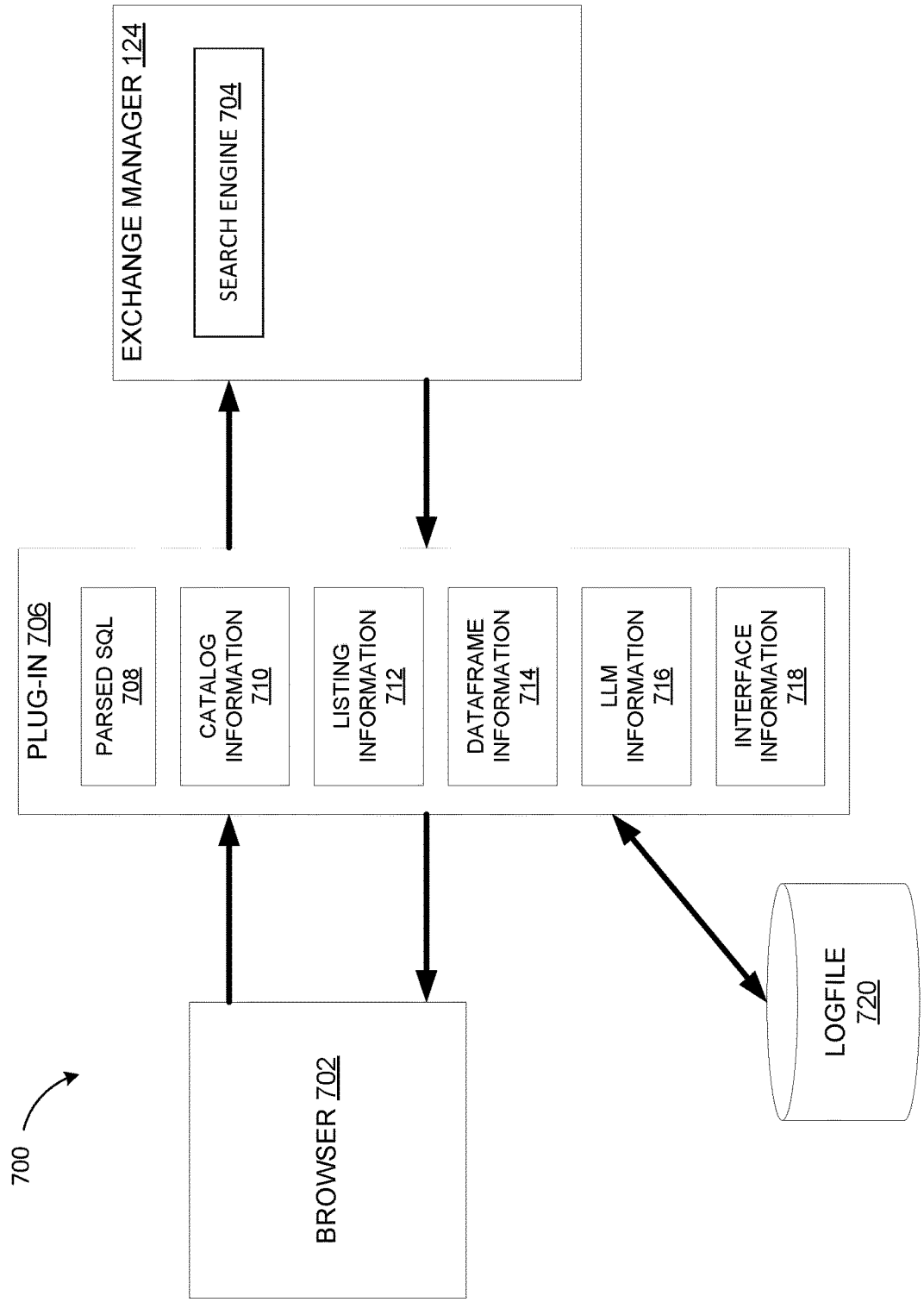
FIG. 7 is a schematic block diagram illustrating the relationship of a browser plug-in to a web browser and a data exchange.

FIG. 7 is a schematic block diagram illustrating the relationship 700 of a browser plug-in between a web browser and a data exchange. In the example diagram, a browser plug-in 706 has been installed within a browser 702 and communicates with search engine 704 of exchange manager 124. In the example, exchange manager 124 is the exchange manager 124 of FIG. 2. Plug-ins can utilize a modular architecture that allows them to coexist with the core browser functionalities and use browser-specific application programming interfaces (APIs) to access browser features and web content. Plug-ins may require explicit permissions from the user to access certain resources or perform specific actions. At the time of plug-in installation, the browser typically prompts the user to grant the necessary permissions, such as accessing web page content, managing browser history, or interacting with other installed plug-ins.

After installing the plug-in 706 to a web browser, an event can cause, or trigger, the plug-in 706 to search a data exchange and provide data listing recommendations to the user. In some embodiments, these recommendations are provided through a mini-browsing view originating from the plug-in 706. In some embodiments, this mini-browsing view is comparable to the presentations of the published data listings 604A-D of FIG. 6. In some embodiments a selection of listings may be provided, ranked by relevance, and a user can skim through the listings. In another embodiment, the most relevant single result can be shown. Upon finding a suitable listing, in some embodiments, the listing can be installed to the user's data exchange account without having to navigate to the data exchange. At a later time, upon accessing their data exchange account, the new listing is available to and consumable by the user.

Embodiments include at least three ways of informing, or triggering, the plug-in 706 to perform a search of a data exchange: manually; automatically; and a hybrid variation of automatically. When manual triggering is employed, the user can explicitly click on the browser plug-in icon (See icon 602 of FIG. 6) and be provided with a search prompt, often a text box. In some embodiments, the search prompt may be pre-filled with search criteria obtained from the user's browser history or plug-in history. The search query is then sent to the data exchange, and relevant results returned to the plug-in 706, which are then displayed.

Automatic triggering can result from the plug-in 706 monitoring the user's activity and detecting the use of a database system or data exchange. In some embodiments, the plug-in 706 extracts terms from the interaction with the data exchange and sends those extracted terms to the data exchange. In some embodiments, extracted terms are persisted as parsed SQL 708, catalog information 710, or listing information 712. In some embodiments, extracted terms are manifested as dataframe information 714 or large language model (LLM) information 716. In some embodiments, extracted terms are manifested as programmatic interface fields and stored as interface information 718. In some embodiments, parsing of the queries to extract the terms occurs at the client in order to maintain privacy. In some embodiments, the data exchange responds with listings that are related to those listings relevant to the implicit search terms, i.e., the extracted terms. For example, if the user is working with inventory data across the US, related listings might include US demographic or US weather data. In some embodiments the data exchange catalog information is persisted in catalog information 710 within the plug-in 706.

Having been provided with at least one listing, the data exchange service behind the plug-in 706 can determine other related listings. In some embodiments, an affinity between two listings can be based on user-behavior, e.g., whether users have co-viewed, co-installed, or co-used that pair of listings. In some embodiments, affinity between two listings may be listing/data-specific, for example, whether they share common column names or semantic types, such as address or ZIP code. In some embodiments, affinity between two listings may result from sharing data values, such as names, addresses, etc.

In some embodiments, hybrid triggering involves the plug-in 706 actively monitoring the user's activity, but only executing detection logic, i.e., parsing the browser contents and extracting the needed search terms, upon the user's instruction. In some embodiments, this can be accomplished by clicking on the plug-in's icon in the browser.

For the embodiments involving automatic or hybrid triggering, a determination needs to be made as to the type or category of data with which the user is working, so as to provide relevant listings. In some embodiments, the plug-in 706 can extract and examine specific fields from which to determine relevant listings. In some embodiments, these extracted fields can correspond to table names, column names, and database/schema names. In some embodiments, these fields can be extracted after parsing a SQL query, e.g., "SELECT <column_name1>, <column_name2> FROM <table_name> WHERE . . . " In some embodiments, this parsed SQL 708 is persisted in the plug-in 706. In some embodiments, more extensive information from the data exchange catalog is persisted in the plug-in 706 as catalog information 710.

In some embodiments, a user might be utilizing a client feature that allows the use of dataframes. A dataframe is a data structure that organizes data into a 2-dimensional table of rows and columns, much like a spreadsheet. Dataframes can be a flexible and intuitive way of storing and working with data. While dataframes are similar to database tables, dataframes are lists of vectors of equal length while a table (data.table) is an inheritance of dataframes. Thus, tables can be construed as dataframes but dataframes are not necessarily tables. As an example, using the Python PANDAS library, the plug-in 706 can parse specific fields in the client's interface. As another example, in SNOWFLAKE™ Snowpark, the query "SELECT * FROM MY_TABLE" could be written as session.table ("my_table").collect ( ) In such an embodiment, the plug-in 706 can parse the statement and extract the arguments passed via an interface to the table ( ) function. Extracted arguments from programmatic interface functions can be persisted in interface information 718. Similarly, embodiments using filter ( ) or rename ( ) functions may contain column-names as their arguments. In some embodiments, dataframe information 714 is persisted in the plug-in 706.

In some situations, a user may be working with both tables and columns, and the plug-in 706 may detect both. In some embodiments, the plug-in 706 can differentiate between tables and columns and leverage the search capabilities of the data exchange. If the search is primarily keyword-based, embodiments can send just the table_name to the data exchange, or send the table_name with weighting, followed by the column names. In some embodiments, the plug-in 706 may send both. In some embodiments, using an LLM, the search query can be formatted into a free text sentence of the form "A user is using data table <table_name> with columns <column_name 1>, <column_name2>." In some embodiments, the plug-in 706 may persist free text sentences and other LLM input in the plug-in 706 as LLM Information 716. In some embodiments, the plug-in 706 might anticipate the user accessing multiple distinct tables within their text. In some embodiments, the plug-in 706 can recommend the most relevant listing to the user. In some embodiments, that may correspond to names and values of tables and columns extracted from a user's notebook document or other programming environment. In some embodiments, the extracted information may be ordered to correlate with the user's most recent activity. In some embodiments using an LLM, the plug-in 706 can accept a statement of an overall project context as a basis for suggesting relevant listings.

In embodiments, several means are contemplated for allowing the plug-in 706 to communicate with the data exchange on behalf of a user, i.e., as permitted by user account privileges. In a first embodiment, a user can log in to the data exchange, via the plug-in 706, by providing their username and password, or using another form of authentication supported by both the plug-in 706 and the data exchange. In another embodiment, upon logging in to the data exchange, the user is provided with an access token that can be used by the plug-in 706 on behalf of the user.

In some embodiments, to provide an audit capability and to support additional privacy, data used by the plug-in 706, particularly the queries and extracted terms that are communicated with the data exchange, can be written to a logfile 720 on the client device. In some embodiments, logfile 720 can be accessible via the plug-in 706. In some embodiments, logfile 720 can be accessible via local client utilities.

Figure 8:
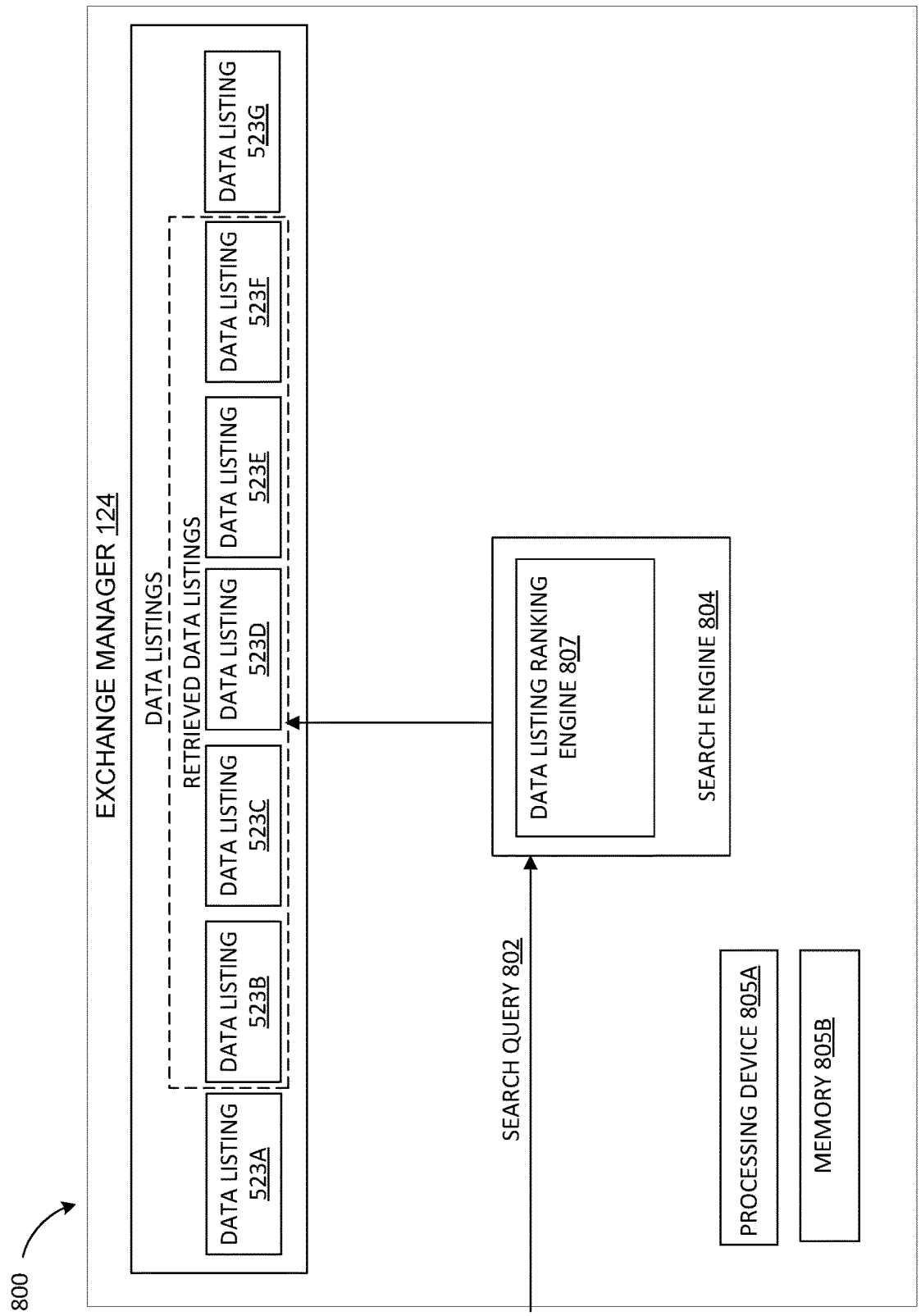
FIG. 8 is a schematic block diagram illustrating the generation of suggestions for relevant listings in a data exchange, in accordance with some embodiments of the present disclosure.

FIG. 8 is a schematic block diagram illustrating the generation of suggestions for relevant listings in a data exchange, using a plug-in, in accordance with some embodiments of the present disclosure. A description of elements of FIG. 8 that have been previously described will be omitted for brevity.

The exchange manager 124 may be a computing device, and may include hardware such as processing device 805A, e.g., processors, central processing units (CPUs), memory 805B, e.g., random access memory, (RAM), storage devices, e.g., hard-disk drives (HDDs), solid-state drives (SSDs), and other hardware devices, e.g., sound cards or video cards.

Processing device 805A may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 805A may also include one or more special-purpose processing devices such as a microcontroller, an application specific integrated circuit (ASIC), a field programmable gate array (FPGA), a digital signal processor (DSP), network processor, or the like.

Memory 805B may include volatile memory devices, e.g., RAM, non-volatile memory devices, e.g., flash memory, and/or other types of memory devices. As a non-limiting example, the non-volatile memory may include a read-only memory (ROM), a programmable read-only memory (PROM), an erasable programmable read-only memory (EPROM), an electrically erasable programmable read-only memory (EEPROM), or a flash memory. In certain implementations, memory 805B may be non-uniform access (NUMA), such that memory access time depends on the memory location relative to processing device 805A. In some embodiments, memory 805B may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 805B may be configured for long-term storage of data and may retain data between power on/off cycles.

In an embodiment, the search engine 804 may receive a search query 802. In some embodiments, search query 802 and search engine 804 may correspond to search query 502 and search engine 504 of FIG. 5. In some embodiments, search query 802 may be provided by the interface 500 of FIG. 5 as a result of input provided by a user to the keyword search bar 525B. The search engine 804 may provide the search query 802 to a data listing ranking engine 807 which may perform the search and filtering functions described herein. More specifically, the data listing ranking engine 807 may provide and order listings that are most relevant to the specific combination of a received search query 802 and the user during the ranking phase.

The search engine 804 may receive the search query 802 consisting of search terms, selections from one or more of the drop-down menus 525A and/or selection of one or more of the category filters 525C (see FIG. 5). As an example, the search query 802 may include individual search terms such as "weather." In response, the search engine 804 may retrieve those data listings 523 that match the search query 802, to obtain retrieved listings 523B-F as shown in FIG. 5. The retrieved set of listings may be a subset of all the data listings, e.g., 523A-H, that are within the data exchange. Once the listings 523B-F have been retrieved, the search engine 804 may transition to the ranking phase. During the ranking phase, the search engine 804 may execute the data listing ranking engine 807 to rank results in response to the search query 802.

Figure 9:
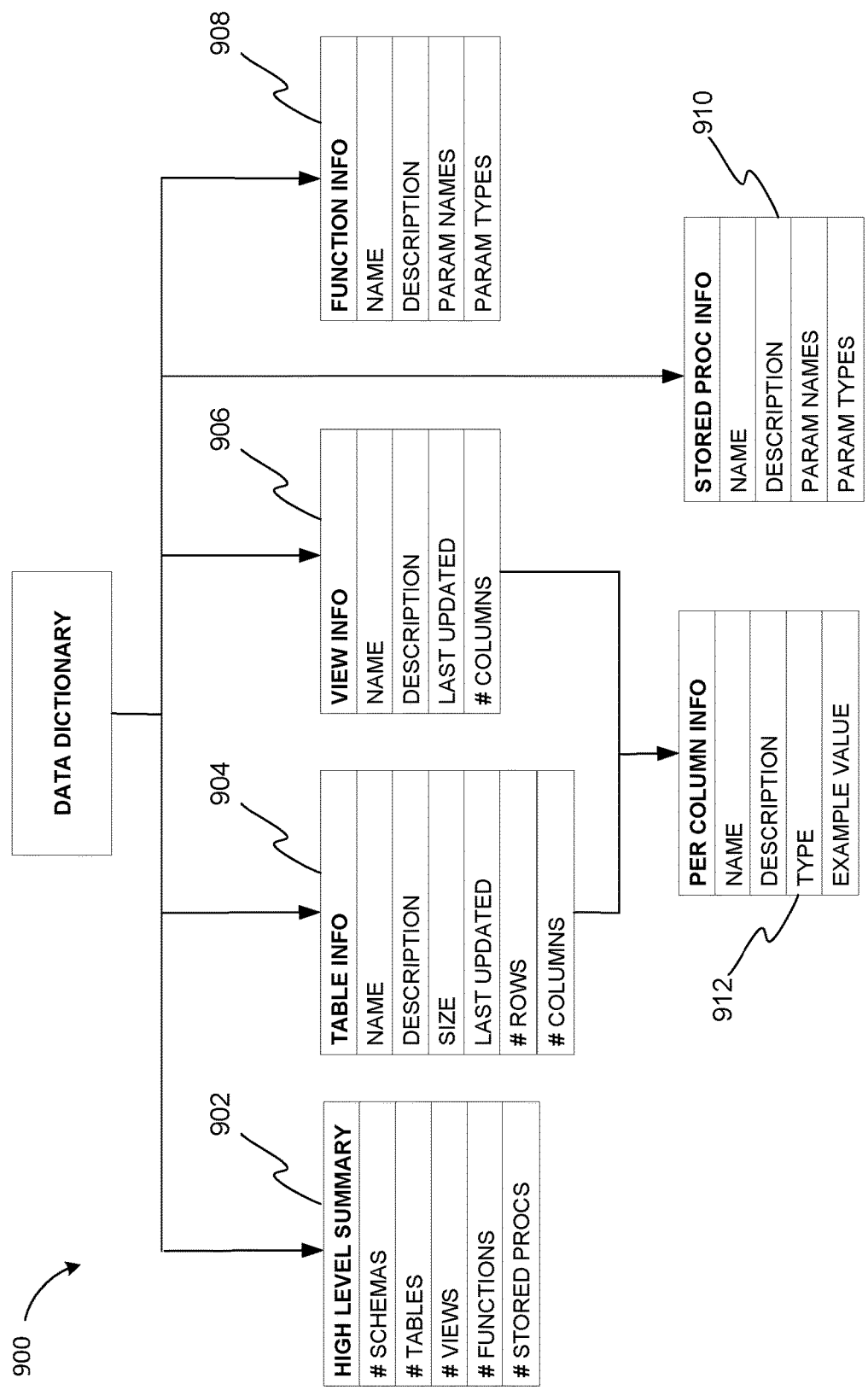
FIG. 9 is a block diagram illustrating an example of a data dictionary, in accordance with some embodiments of the present disclosure.

FIG. 9 is a block diagram illustrating an example data dictionary 900, in accordance with some embodiments of the present disclosure. As shown, the data dictionary 900 includes a high-level summary 902 of the shared data provided by the data listing 523, table information 904 describing the tables included in the shared data, view information 906 describing views in the shared data, function information 908 describing functions in the shared data and stored procedure information 910 describing stored procedures in the shared data. Per column information 912 is also provided for each table and view in the shared data. As shown, each of the objects includes a set of data fields. For example, the high-level summary information 902 includes a number of schemas, tables, views, functions and stored procedures in the shared data. The table information 904 includes a name, description, size, last update, number of rows and number of columns in a table. The view information 906 includes a name, description, last update and number of columns in the view. The function information 908 and stored procedure information 910 both include the name, description, parameter names and parameter types of the function or stored procedure. Similarly, the per column information 912 includes a name, description, data value type, and example value for each column included in a table or view.

FIG. 10 is a block diagram of an example user interface 1000 presenting a description of a listing with a data dictionary, in accordance with some embodiments of the present disclosure. As shown, the user interface 1000 includes a description of the listing 1010, including a written description 1012 and price 1014. Further, the user interface 1000 includes a data dictionary 1016 associated with the listing. The data dictionary 1016 allows a data consumer to view information describing a group of objects included in the shared data, such as tables, views and functions. In some embodiments, a set of featured objects selected by a data provider may be included in the user interface 1000. The user interface 1000 can also include a button 1018 to view additional columns included in a dataset.

Data dictionaries provide the benefit of having information about the listing's data contents, such as table-names and per-column information, in a readily available and organized manner. In some embodiments, the browser plug-in can access the data dictionary to identify related listings.

FIG. 11 is a flow diagram of a method 1100 for providing a user with suggestions for relevant listings in a data exchange, in accordance with some embodiments of the present disclosure. Method 1100 may be performed by processing logic that may comprise hardware, e.g., circuitry, dedicated logic, programmable logic, a processor, a processing device, a central processing unit (CPU), or a system-on-chip (SoC), software, e.g., instructions running/executing on a processing device, firmware, e.g., microcode, or a combination thereof. In some embodiments, the method 1100 may be performed by processing device 505A of exchange manager 124, as illustrated in FIG. 5.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

At block 1110, the method 1100 may include recognizing a data access event, with a browser plug-in, wherein the event constitutes a reference to previously obtained data. In some embodiments, the browser plug-in is triggered automatically through detection of the use of data from a database system or data exchange. In some embodiments, the browser plug-in is triggered automatically through detection of the use of data from a notebook document. For example, if a user first operates on a table named "US_Stock_Data," that term may be used to search for listings, e.g., "Result A," and additional listings may be presented that have relevance to "Result A." In some embodiments, the browser plug-in is triggered by the user clicking on the browser plug-in icon. In some embodiments, while the browser plug-in is aware of the user's activity, detection logic is only run at the user's explicit instruction, e.g., by clicking the browser plug-in icon.

At block 1120, the method 1100 may include, as a result of recognizing the data access event, sending, by the browser plug-in to a search engine of a data exchange, a set of extracted terms. In some embodiments, the set of extracted terms are obtained by parsing a SQL query. In some embodiments, the set of extracted terms is derived from one or more SQL queries exchanged with the data exchange. In some embodiments, the set of extracted terms include table names and column names associated with a data dictionary. In some embodiments, the set of extracted terms include a text sentence consumable by a large language model. In some embodiments, table names and column names, in the set of extracted terms, have weights assigned to them, to prioritize their application within the data exchange search engine. In some embodiments, the extracted terms comprise one or more dataframes.

At block 1130, the method 1100 may include receiving, from the data exchange, a set of data listings related to the extracted terms. In some embodiments, a plurality of related data listings may be received. In some embodiments, the plurality of related data listings may be sorted in order of relevance. In some embodiments, a single related data listing, of greatest relevance, may be received. In some embodiments, the relevance of the related data listings comprises one or more of: a popularity score of the data listing, a click-through rate of the data listing, account-specific data corresponding to an account that issued the search query, and user-specific data of a user that issued the search query. In some embodiments, the received set of related data listings are statistically related to the extracted terms At block 1140, the method 1100 may include, upon a selection of a data listing from the set of related data listings, installing the data listing to an account. In some embodiments, a user may log into their account before installing the data listing.

Figure 12:
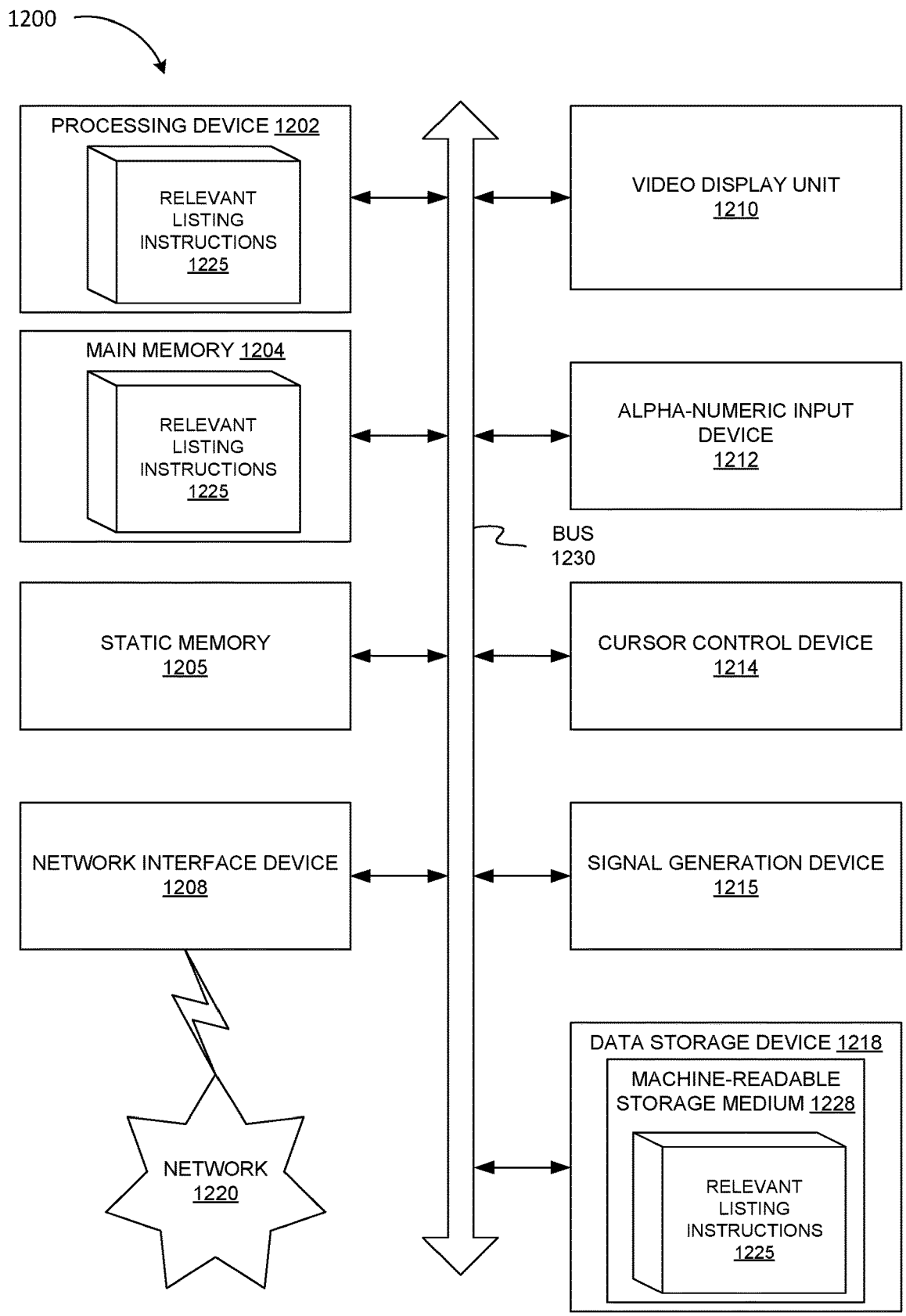
FIG. 12 is a block diagram of an example computing device that may perform one or more of the operations described herein, in accordance with some embodiments of the present disclosure.

FIG. 12 is a block diagram of an example computing device that may perform one or more of the operations described herein, in accordance with some embodiments of the present disclosure. FIG. 12 illustrates an example computing device 1200 within which a set of instructions may provide a user with suggestions for relevant listings in a data exchange, in accordance with some embodiments of the present disclosure, as discussed in further detail herein.

In alternative embodiments, the machine may be connected, e.g., networked, to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1200 may be representative of a server.

The exemplary computer system 1200 includes a processing device 1202, a main memory 1204, e.g., read-only memory (ROM), flash memory, dynamic RAM (DRAM)), static memory 1205, e.g., flash memory or static RAM (SRAM), and a data storage device 1218, that communicate with each other via a bus 1230. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 1200 may further include a network interface device 1208 which may communicate with a network 1220. The computing device 1200 also may include a video display unit 1210, e.g., a liquid crystal display (LCD) or a cathode ray tube (CRT), an alphanumeric input device 1212, e.g., a keyboard, a cursor control device 1214, e.g., a mouse and an acoustic signal generation device 1215, e.g., a speaker. In one embodiment, video display unit 1210, alphanumeric input device 1212, and cursor control device 1214 may be combined into a single component or device, e.g., an LCD touch screen.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute relevant listing instructions 1225, for performing the operations and steps discussed herein.

The data storage device 1218 may include a machine-readable storage medium 1228, on which is stored one or more sets of relevant listing instructions 1225, e.g., software embodying any one or more of the methodologies of functions described herein. The relevant listing instructions 1225 may also reside, completely or at least partially, within the main memory 1204 or within the processing device 1202 during execution thereof by the computer system 1200; the main memory 1204 and the processing device 1202 also constituting machine-readable storage media. The relevant listing instructions 1225 may further be transmitted or received over a network 1220 via the network interface device 1208.

The machine-readable storage medium 1228 may also be used to store instructions to perform the methods described herein. While the machine-readable storage medium 1228 is shown in an exemplary embodiment to be a single medium, the term "machine-readable storage medium" should be taken to include a single medium or multiple media, e.g., a centralized or distributed database, or associated caches and servers, that store the one or more sets of instructions. A machine-readable medium includes any mechanism for storing information in a form, e.g., software, processing application, readable by a machine, e.g., a computer. The machine-readable medium may include, but is not limited to, magnetic storage medium, e.g., a floppy diskette; an optical storage medium, e.g., a CD-ROM; magneto-optical storage medium; read-only memory (ROM); random-access memory (RAM); erasable programmable memory, e.g., EPROM or EEPROM; flash memory; or another type of medium suitable for storing electronic instructions.

Unless specifically stated otherwise, terms such as "recognizing," "sending," "receiving," "selecting," "extracting," "installing," "parsing," "presenting," or the like, refer to actions and processes performed or implemented by computing devices that manipulate and transform data represented as physical (electronic) quantities within the computing devices' registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112 (f) for that unit/circuit/component. Additionally, "configured to" or "configurable to" can include generic structure, e.g., generic circuitry, that is manipulated by software and/or firmware, e.g., an FPGA or a general-purpose processor executing software, to operate in manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources, e.g., networks, servers, storage, applications, and services, that can be rapidly provisioned (including via virtualization) and released with minimal management effort or service provider interaction and then scaled accordingly. A cloud model can be composed of various characteristics, e.g., on-demand self-service, broad network access, resource pooling, rapid elasticity, and measured service, service models, e.g., Software as a Service ("SaaS"), Platform as a Service ("PaaS"), and Infrastructure as a Service ("IaaS"), and deployment models, e.g., private cloud, community cloud, public cloud, and hybrid cloud.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the embodiments of the present disclosure are not to be limited to the details given herein, but may be modified within the scope and equivalents of the appended claims.

What is claimed is:

1. A method comprising:
recognizing, by a processing device and using a browser plug-in, a data access event with respect to a notebook document displaying computer code and rich text elements, wherein the data access event constitutes a reference to previously obtained data;
as a result of recognizing the data access event with respect to the notebook document, extracting, by the browser plug-in, a set of terms from at least one of the computer code or the rich text elements in the notebook document;
sending, by the browser plug-in to a search engine of a data exchange, the set of terms;
receiving, from the data exchange, a set of data listings of the data exchange related to the set of terms;
providing, by the browser plug-in, a mini-browsing view that displays identifiers for the set of data listings concurrently with the notebook document; and
upon a selection of an identifier of a data listing of a data provider from the identifiers for the set of data listings displayed in the mini-browsing view, causing the data listing to be installed to an account of a data consumer of the data exchange to provide the data consumer with access to the data listing in the data exchange in a manner specified by the data provider.

2. The method of claim 1, wherein the set of terms is obtained by the browser plug-in.

3. The method of claim 2, wherein the set of terms is obtained by parsing a structured query language (SQL) query.

4. The method of claim 2, wherein the set of terms is obtained from a set of dataframes.

5. The method of claim 2, wherein the set of terms is obtained from free text input to a large language model.

6. The method of claim 1, wherein the set of terms corresponds to at least one of table names or column names.

7. The method of claim 1, wherein the set of data listings related to the set of terms is statistically related to the set of terms.

8. The method of claim 1, wherein each extracted term in the set of terms is assigned an individual weight.

9. The method of claim 1, wherein the set of terms is obtained from a table statement of a programmatic interface.

10. The method of claim 1, wherein the set of terms includes information on previously viewed data.

11. A system comprising:
a memory; and
a processing device operatively coupled to the memory, the processing device to:
recognize, using a browser plug-in, a data access event with respect to a notebook document displaying computer code and rich text elements, wherein the data access event constitutes a reference to previously obtained data;
as a result of recognizing the data access event with respect to the notebook document, extract, by the browser plug-in, a set of terms from at least one of the computer code or the rich text elements in the notebook document;
send, by the browser plug-in to a search engine of a data exchange, the set of terms;
receive, from the data exchange, a set of data listings of the data exchange related to the set of terms;
provide, by the browser plug-in, a mini-browsing view that displays identifiers for the set of data listings concurrently with the notebook document; and
upon a selection of an identifier of a data listing of a data provider from the identifiers for the set of data listings displayed in the mini-browsing view, cause the data listing to be installed to an account of a data consumer of the data exchange to provide the data consumer with access to the data listing in the data exchange in a manner specified by the data provider.

12. The system of claim 11, wherein the processing device is further to:
cause the browser plug-in to obtain the set of terms.

13. The system of claim 12, wherein to cause the browser plug-in to obtain the set of terms, the processing device is to:
obtain the set of terms by parsing a structured query language (SQL) query.

14. The system of claim 12, wherein to cause the browser plug-in to obtain the set of terms, the processing device is to:
obtain the set of terms from a set of dataframes.

15. The system of claim 12, wherein to cause the browser plug-in to obtain the set of terms, the processing device is to:
obtain the set of terms from free text input to a large language model.

16. The system of claim 11, wherein the set of terms corresponds to at least one of table names or column names.

17. The system of claim 11, wherein the set of data listings related to the set of terms is statistically related to the set of terms.

18. The system of claim 11, wherein each term in the set of terms is assigned an individual weight.

19. The system of claim 11, wherein to cause the browser plug-in to obtain the set of terms, the processing device is to:
obtain the set of terms from a table statement of a programmatic interface.

20. The system of claim 11, wherein the set of terms includes information on previously viewed data.

21. A non-transitory computer-readable medium having instructions stored thereon which, when executed by a processing device, cause the processing device to:
recognize, by the processing device and using a browser plug-in, a data access event with respect to a notebook document displaying computer code and rich text elements, wherein the data access event constitutes a reference to previously obtained data;
as a result of recognizing the data access event with respect to the notebook document, extract, by the browser plug-in, a set of terms from at least one of the computer code or the rich text elements in the notebook document;
send, by the browser plug-in to a search engine of a data exchange, the set of terms;
receive, from the data exchange, a set of data listings related to the set of terms;
provide, by the browser plug-in, a mini-browsing view that displays identifiers for the set of data listings concurrently with the notebook document; and
upon a selection of an identifier of a data listing of a data provider from the identifiers for the set of data listings, cause the data listing to be installed to an account of a data consumer of the data exchange to provide the data consumer with access to the data listing in the data exchange in a manner specified by the data provider.

22. The non-transitory computer-readable medium of claim 21, wherein the instructions, when executed by the processing device, further cause the processing device to:
cause the browser plug-in to obtain the set of terms.

23. The non-transitory computer-readable medium of claim 22, wherein to cause the browser plug-in to obtain the set of terms, the instructions, when executed by the processing device, cause the processing device to:
obtain the set of terms by parsing a structured query language (SQL) query.

24. The non-transitory computer-readable medium of claim 22, wherein to cause the browser plug-in to obtain the set of terms, the instructions, when executed by the processing device, cause the processing device to:
obtain the set of terms from a set of dataframes.

25. The non-transitory computer-readable medium of claim 22, wherein to cause the browser plug-in to obtain the set of terms, the instructions, when executed by the processing device, cause the processing device to:
obtain the set of terms from free text input to a large language model.

26. The non-transitory computer-readable medium of claim 22, wherein to cause the browser plug-in to obtain the set of terms, the instructions, when executed by the processing device, cause the processing device to:
obtain the set of terms from a table statement of a programmatic interface.

27. The non-transitory computer-readable medium of claim 21, wherein the set of terms corresponds to at least one of table names or column names.

28. The non-transitory computer-readable medium of claim 21, wherein the set of data listings related to the set of terms is statistically related to the set of terms.

29. The non-transitory computer-readable medium of claim 21, wherein the instructions, when executed by the processing device, further cause the processing device to:
assign each term in the set of terms an individual weight.

30. The non-transitory computer-readable medium of claim 21, wherein the set of terms includes information on previously viewed data.

* * * * *